United States Patent [19]

Lister

[11] 3,790,788
[45] Feb. 5, 1974

[54] LINE-FOLLOWER
[75] Inventor: Paul Frank Lister, Birmingham, England
[73] Assignee: The British Oxygen Company Limited, London, England
[22] Filed: Nov. 3, 1971
[21] Appl. No.: 195,333

[30] Foreign Application Priority Data
Nov. 5, 1970   Great Britain.................. 52,746/70

[52] U.S. Cl................................. 250/202, 250/235
[51] Int. Cl............................................ G05b 1/00
[58] Field of Search ............ 250/202, 220, 234, 235

[56] References Cited
UNITED STATES PATENTS

| | | | |
|---|---|---|---|
| 3,441,735 | 4/1969 | King.................................... | 250/202 |
| 3,470,376 | 9/1969 | Moss................................... | 250/202 |
| 2,446,969 | 5/1969 | Lange................................. | 250/202 |
| 3,017,552 | 1/1962 | Brouwer.......................... | 250/202 X |
| R25,581 | 5/1964 | Cheverton.......................... | 250/202 |
| 3,240,941 | 5/1966 | Zuckerbraun................... | 250/202 X |

Primary Examiner—James W. Lawrence
Assistant Examiner—D. C. Nelms
Attorney, Agent, or Firm—Dennison, Dennison, Townshend & Meserole

[57] ABSTRACT

A line-follower including two photoelectric cells able to be oscillated in unison transversely to the axis of the line being followed. One cell is arranged to produce a steering signal and the other an error-displacement signal.

1 Claim, 4 Drawing Figures

PATENTED FEB 5 1974 3,790,788

LINE-FOLLOWER

This invention relates to 'line followers', by which is meant apparatus for following a linear pattern to cause an associated tool to move relatively to a workpiece along a path corresponding to that of the pattern.

The line follower of the present invention generates its steering signals photoelectrically, so that the term 'line' is to be interpreted as covering any pattern of sufficient optical contrast with its background to generate the desired signals.

The term 'tool' is intended to include any device for doing work on a workpiece, such as a cutting or welding torch using an electric arc or plasma or a gas flame, or a laser or equivalent device producing a beam of energy-carriers. All these tools are distinguished by the fact that an appropriate signal can be used to inhibit the tool from doing work on the workpiece while still moving relatively to it.

In our copending UK patent application No. 56 000/69 is described a line follower designed to follow a pattern consisting of thick and thin lines. When following a thin line the follower operates the tool to do work upon the workpiece, but when following a thick line an inhibition signal is produced to inhibit operation of the tool, but not its relative movement.

This follower has the disadvantage that the level of the inhibition signal produced when the follower is following a thick line is sometimes insufficiently differentiated from its level when the follower is following a thin line, leading to occasional malfunction of the tool.

The present invention aims at providing a line follower in which the amplitude of the differential inhibition signal is increased without degrading operation of the follower.

Accordingly the present invention provides a line-follower including first and second pendularmounted cells able to scan the line being followed by being oscillated in unison transversely to the axis of the line being followed, and an optical system for each cell, in which the first cell is positioned to receive a focussed real image of the line being followed, and in which the second cell is positioned to receive a smaller unfocused image of the line being followed.

The present invention will now be described by way of example with reference to the accompanying drawing, in which.

Figure 1:
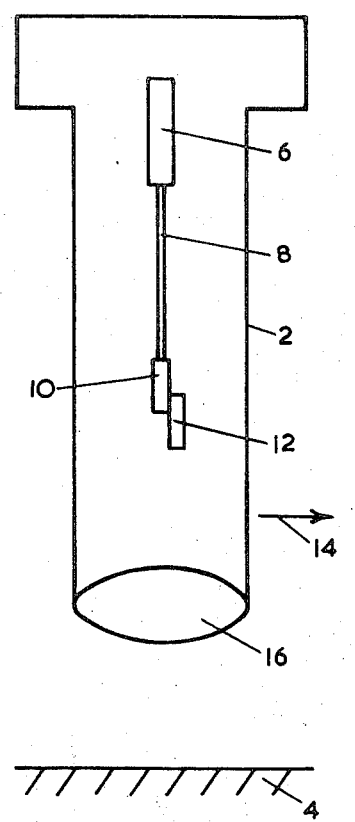
FIG. 1 is a diagrammatic representation of the salient parts of a line-follower of the present invention.
Figure 4:
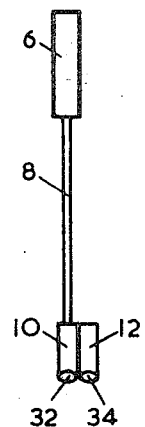
FIG. 4 is a diagrammatic representation of the salient parts of another line-follower of the present invention.
Figure 4:
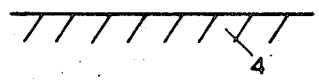

In the following description, like parts in FIGS. 1 and 4 are referred to by the same references.

Figure 3:
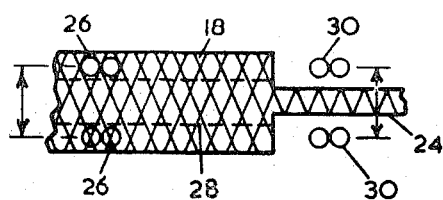
FIG. 3 is a diagrammatic view of thick and thin portions of the pattern being followed to illustrate operation of the line follower of the invention.

In FIG. 1 of the accompanying drawing the line follower is represented by a housing 2 which is intended to be moved (by means which are not shown) over a surface 4 on which is placed a drawing having on it a pattern of lines to be followed. As shown in FIG. 3 (which is a considerably amplified plan view of a fragment of a typical drawing) sections of thin lines are coterminous with sections of thick lines, the intention being that the follower follows the common axis of the thick and thin lines to cause the associated tool to move relatively to a workpiece in a path corresponding to the pattern being followed. There may be 1:1 correspondence between the drawn pattern and the pattern worked on by the tool, but in other applications tehere may be a 10:1 (or other ratio) correspondence between the two patterns. This is well known in the line-following art.

In the line-follower of the present invention a piezoelectric crystal 6 carries a rod 8 supporting a pair of photoelectric cells which are displaced by different distances from the (virtual) pivotal axis of the rod 8. The upper cell 10 is coaxial with the support rod 8, while the lower cell 12 is displaced forwardly of cell 10 in the direction of movement (indicated by arrow 14) of the follower with respect to the platform 4.

The piezoelectric crystal 6 is of the bender type, and is secured at its upper end so that as appropriate alternating voltages are applied between the electrodes across the crystal the lower end of the crystal is forced to oscillate at a desired frequency. The means by which the crystal is oscillated do not form part of the subject-matter of this invention and so are not described in further detail. The plane in which the rod 8 (and with it the cells 10 and 12) is oscillated is perpendicular to the axis of the line being followed. As the follower moves along the length of the line the optical axes of the two photoelectric cells trace out a roughly sinusoidal path.

The support for the crystal 6 and the components moveable with it is not fixed, but is adapted to be rotated so that a plane containing the axes of the two photoelectric cells remains substantially parallel with the axis of the line being followed at any time, or a tangent thereto. The cell generating the signal that controls this rotational movement of the crystal is the front cell 12. By means which are known in themselves (and are therefore not described in greater detail in this specification) the crystal is rotated to ensure that the optical axis of cell 12 spends equal times traversing areas on both sides of the line being followed as the cells are oscillated through an angle giving rise to a known scan-width greater than the thickness of the thin line being followed.

The rear cell 10 of the pair of cells is coaxial with the rotational axis of the crystal 6 and is designed to generate an 'error-displacement' signal when the centre of its scanwidth becomes displaced to either side of the axis of that portion of the line being followed at any one time. For reasons which are well known in the line-following art, and which are therefore not elaborated upon in this specification, this error-displacement signal is used to cause the line follower to remain accurately aligned with the axis of the line being followed, even when the line bends through relatively sharp bends or corners.

In the line follower of the present invention an optical system, represented by a double convex lens 16, is introduced between the pattern to be followed and the photoelectric cells. This causes the cell to respond to receipt of images of the line being followed, and not the line itself.

In the line follower of the present invention the signal produced by the 'displacement' cell 10 is also used as a signal for inhibiting operation of the associated tool. This operates by comparing the level of the signal from cell 10 when the follower is scanning thin lines with the level when it is scanning thick lines. When scanning thin lines the optical axis of cell 10 crosses the boundary of the thin line four times per cycle, as the scanwidth is greater than the line thickness. This crossing of the boundary leads to a relatively high amplitude signal.

When the follower starts to follow a thick line, the level of this signal falls appreciably because the scanwidth is arranged to be less than the thickness of the thick line, so that the optical axis of cell 10 never crosses a boundary of the thick line. This drop in the amplitude of the signal from cell 10 is caused to generate an inhibition signal which causes the associated tool to discontinue doing work on the workpiece. The inhibition signal is removed when the line-follower next starts following a thin line.

Figure 2:
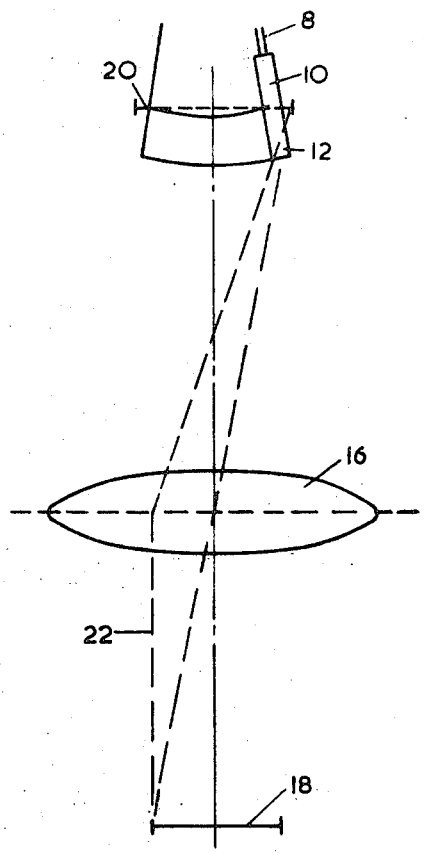
FIG. 2 is an optical diagram to assist in understanding operation of the invention.

This desirable end has been achieved by arranging for the scanwidth of cell 10 to lie wholly within the boundaries of the thick line. This would normally have the effect, if it were not for the present invention, that the cell 12 would not be able to generate any effective steering signals, so that the device would not be able to function effectively. However this defect is overcome by lowering the 'steering' cell 12 relatively to 'displacement' cell 10, and introducing the optical system represented by lens 16. The effect of these two provisions is to cause the cell 12 to scan a 'virtual' line of thickness less than its effective scanwidth, so that it generates the usual steering signal. Operation of the invention will now be described with reference to FIG. 2.

In this Figure the thick line 18 being scanned is formed into an image 20 by the lens 16, the appropriate parts of the optical path being illustrated by broken lines 22. The upper cell 10 is arranged so that it receives the light forming the image 20. However it will be seen from FIG. 2 that the lower cell 12 receives light from a shorter, unfocussed image of the line 18. The effective virtual displacement of the two cells 10 and 12 is related to the optical characteristics of the lens 16 and the angle of oscillation of the support 8 so that the limits of the scanwidth of cell 10 are always within the limits of image 20, whereas the limits of the effective scanwidth of cell 12 are outside the limits of the unfocussed portion of the image of line 18 which cell 12 receives.

This is illustrated also in FIG. 3, in which a portion of thick line 18 is shown as being coterminous with the portion of thin line 24. The pairs of circles 26 represent the limits of the real scanwidth of the photocells, such as would be effective should the cells 10 and 12 be mounted at the same height as each other. However the vertical displacement downwards of cell 12, as discussed above, results in the effective thickness of the line 18 as viewed by cell 12 being reduced to produce a line of virtual thickness indicated by the parallel broken lines 28. As the effective optical axis of cell 12 crosses these lines 28 four times for each cycle of operation, then it will be appreciated that the cell 12 generates the usual steering signals.

When the follower moves over the thin portion of the line 24, the effective scanwidths of both pairs of cells lie outside the boundaries of the line 24, so that the virtual thinning of line 24 as viewed by cell 12 is of no practical consequence, but the signal produced by cell 10 now functions an error-displacement signal and not as an inhibition signal. These limits of the scanwidth of the follower are likewise indicated by pairs of circles 30.

It will thus be seen that the present invention provides simple means whereby the level of the signal produced by the cell 10 when scanning thick and thin lines is significantly increased by allowing the effective optical axis of cell 10 not to cross the boundaries of thick lines when they are being followed, while providing for the continued generation of the usual steering signals.

In the line-follower shown in FIG. 4 the cells 10 and 12 are equidistant from the line being followed, and each cell has a separate optical system. The windows 32 and 34 of the cells 10 and 12 are double convex lenses, the lens 32 having a smaller focal length than the lens 34. Thus the cell 12 receives an unfocused image of the line being followed that is smaller than the focussed image received by the cell 10.

Although it is possible to mount the cells 10 and 12 on separate rods, difficulties may arise in keeping their oscillations in phase.

What we claim is:

1. A line-follower including first and second pendular-mounted photoelectric cells to scan the line being followed by being oscillated in unison transversely to the axis of the line being followed, and an optical system for each cell, in which the first cell is positioned to receive a focussed real image of the line being followed, and in which the second cell is positioned to receive a small unfocussed image of the line being followed.

* * * * *